(12) United States Patent
Matthew et al.

(10) Patent No.: US 9,594,554 B2
(45) Date of Patent: Mar. 14, 2017

(54) EXTRACTION AND TRANSFORMATION OF EXECUTABLE ONLINE DOCUMENTATION

(71) Applicant: International Business Machines Corporation, Armonk, NY (US)

(72) Inventors: Michelle S. Matthew, Slough (GB); John J. P. McNamara, Winchester (GB); Craig H. Stirling, Hedge End (GB); Ian T. Stirling, Chandlers Ford (GB)

(73) Assignee: International Buisness Machines Corporation, Armonk, NY (US)

( * ) Notice: Subject to any disclaimer, the term of this patent is extended or adjusted under 35 U.S.C. 154(b) by 0 days.

(21) Appl. No.: 14/813,162

(22) Filed: Jul. 30, 2015

(65) Prior Publication Data

US 2017/0031679 A1 Feb. 2, 2017

(51) Int. Cl.
*G06F 9/44* (2006.01)
*G06F 17/22* (2006.01)
*G06F 17/30* (2006.01)

(52) U.S. Cl.
CPC .......... *G06F 8/73* (2013.01); *G06F 8/74* (2013.01); *G06F 17/2247* (2013.01); *G06F 17/30011* (2013.01); *G06F 17/3061* (2013.01)

(58) Field of Classification Search
CPC .. G06F 8/73; G06F 17/30011; G06F 17/3061; G06F 8/74; G06F 17/2247

(Continued)

(56) References Cited

U.S. PATENT DOCUMENTS

| 5,937,163 | A | * | 8/1999 | Lee | ............ G06F 17/30864 707/999.102 |
| 8,447,823 | B2 | | 5/2013 | Zhang | |

(Continued)

OTHER PUBLICATIONS

"init.d script for Node-RED", GitHub Gist, Bigmonkeyboy, printed on Jul. 8, 2015, pp. 1-3, <https://gist.github.com/bigmonkeyboy/9962293>.

(Continued)

*Primary Examiner* — Viva Miller
(74) *Attorney, Agent, or Firm* — Steven L. Fisher-Stawinski

(57) ABSTRACT

A computer-implemented method includes receiving a content artifact. The content artifact includes information content and functional content. Extracting the functional content includes creating a functional content artifact. The computer-implemented method further includes extracting the functional content into a functional content artifact based on one or more decision criteria. The computer-implemented method further includes presenting the functional content artifact to a functional content artifact application. Optionally, the computer-implemented method further includes transferring the functional content artifact to an operational environment. Optionally, the computer-implemented method further includes modifying the functional content artifact into a modified functional content artifact. Optionally, the computer-implemented method further includes making available the modified functional content artifact available to an operational environment. A corresponding computer program product and computer system are also disclosed.

3 Claims, 4 Drawing Sheets

(58) Field of Classification Search
USPC .......................................................... 717/123
See application file for complete search history.

(56) References Cited

U.S. PATENT DOCUMENTS

| | | | | |
|---|---|---|---|---|
| 8,453,049 | B1* | 5/2013 | Grieve | G06F 9/45529 715/234 |
| 8,819,827 | B1 | 8/2014 | Easttom | |
| 2003/0191964 | A1* | 10/2003 | Satyavolu | H04L 63/0815 726/5 |
| 2005/0027714 | A1 | 2/2005 | Kline | |
| 2007/0143317 | A1* | 6/2007 | Hogue | G06F 17/30864 |
| 2009/0094595 | A1* | 4/2009 | Garrett | G06F 9/4446 717/174 |
| 2012/0054595 | A1* | 3/2012 | Mylroie | G06F 17/2247 715/234 |
| 2012/0240192 | A1* | 9/2012 | Orazi | G06F 21/10 726/4 |
| 2014/0359408 | A1 | 12/2014 | Rosenberg | |
| 2015/0106157 | A1* | 4/2015 | Chang | G06F 17/27 705/7.29 |

OTHER PUBLICATIONS

"Messaging—Integration and management of cloud-based and on-premises applications and data", IBM®, IBM Software, Products, Connectivity and application integration, printed on Jul. 8, 2015, pp. 1-2, <http://www-03.ibm.com/software/products/en/category/messaging>.

"Verifying a local installation using the command line", IBM MQ, Version 8.0, IBM Knowledge Center, Last updated: Wednesday, Jun. 24, 2015, printed on Jul. 27, 2015, pp. 1-2, <https://www-01.ibm.com/support/knowledgecenter/SSFKSJ_8.0.0/com.ibm.mq.ins.doc/q009240_.htm>.

\* cited by examiner

EXTRACTION AND TRANSFORMATION OF EXECUTABLE ONLINE DOCUMENTATION

BACKGROUND

The present invention relates generally to online documentation and in particular to online documentation that contains computer program instructions.

Software documentation is written text that accompanies computer software and either explains how it operates or how to use it. Types of documentation include requirements or statements that identify attributes, capabilities, characteristics, or qualities of a system, as well as functional code, which is used to execute a software program. For a system administrator or developer of a software product, software documentation is used in a variety of applications, such as learning, testing, or maintaining a system. When performing any of these tasks, a system administrator or software developer is required to read copious amounts of software documentation. In turn, these users must then interpret the code within the documentation and apply the code to their system. As software products continue to grow and evolve, so too does the amount of software documentation that accompanies this software.

SUMMARY

A computer-implemented method includes receiving a content artifact. The content artifact includes information content and functional content. Extracting the functional content includes creating a functional content artifact. The computer-implemented method further includes extracting the functional content into a functional content artifact based on one or more decision criteria. The computer-implemented method further includes presenting the functional content artifact to a functional content artifact application. A corresponding computer program product and computer system are also disclosed.

Optionally, the computer-implemented method further includes transferring the functional content artifact to an operational environment. This aspect of the invention advances the art by transferring the functional content artifact to an operational environment.

Optionally, the computer-implemented method further includes modifying the functional content artifact into a modified functional content artifact. This aspect of the invention advances the art by modifying the online documentation into a modified functional content artifact.

Optionally, the computer-implemented method further includes making available the modified functional content artifact available to an operational environment. This aspect of the invention advances the art by making available the modified functional content artifact available to an operational environment.

DETAILED DESCRIPTION

Figure 1:
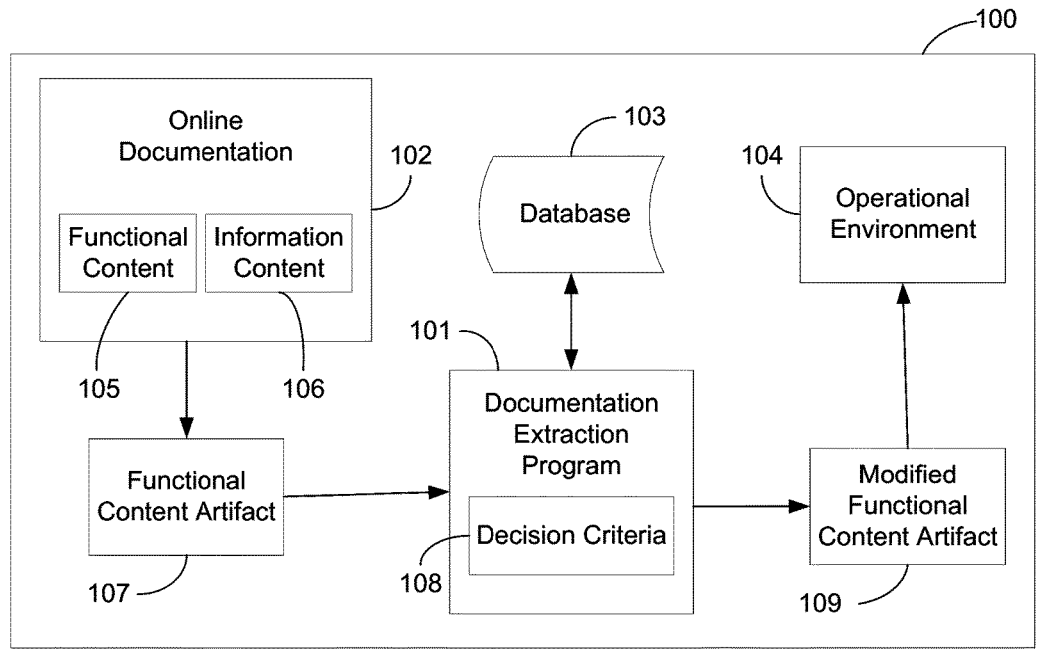
FIG. 1 is a block diagram of one embodiment of a computer system environment suitable for operation in accordance with at least one embodiment of the invention.

Referring now to various embodiments of the invention in more detail, FIG. 1 is a block diagram of one embodiment of a computer system environment suitable for operation in accordance with at least one embodiment of the invention. Within a computer system 100, a documentation extraction program 101 may receive a content artifact from online documentation 102. The content artifact may include functional content 105 and information content 106. In the case of HTML, there exists functional content 105, information content 106, and markup. The documentation extraction program 101 may further extract functional text, such as computer program code, from the functional content 105. Extracting the functional content 105 may include creating a functional content artifact 107. The functional content artifact 107 may be based on one or more decision criteria 108.

The documentation extraction program 101 may further present the functional content artifact 107 to a functional content artifact application. Presenting the functional content artifact 107 to a functional content artifact application may include displaying the functional content artifact 107. The documentation extraction program 101 may further transfer the functional content artifact 107 to an operational environment 104. The documentation extraction program 101 may further modify the functional content artifact 107 into a modified functional content artifact 109. The documentation extraction program 101 may further make available the modified functional content artifact 109 to an operational environment 104.

The process of reading, interpreting, and applying reference code to a production environment of a software product is not only difficult and time consuming, but also prone to error resulting from online documentation 102 that may be directed to an older or differently configured version of software product. It should be appreciated that the documentation extraction program 101 mitigates these issues.

Figure 2:
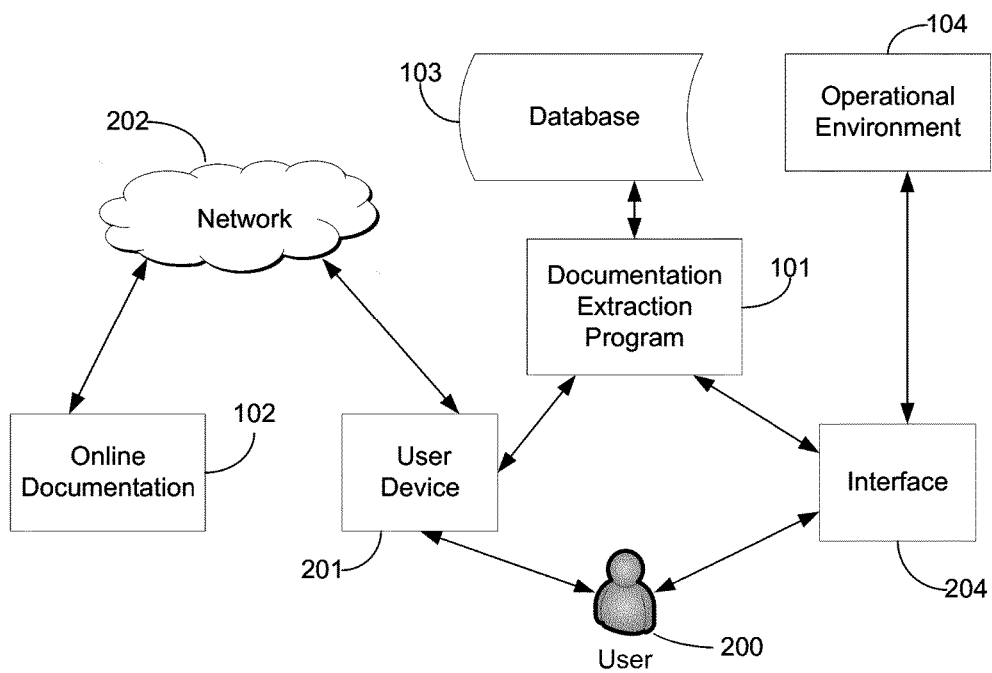
FIG. 2 is a network diagram in accordance with at least one embodiment of the invention.

FIG. 2 presents a block diagram of a network in accordance with at least one embodiment of the invention. In FIG. 2, the documentation extraction program 101 is in communication with the user device 201 and the operational environment 104 where a software product may be accessible via an interface 204. Here, the documentation extraction program 101 may communicate with a software product, for example, located on a UNIX or Linux remote server, by execution of one or more shell script commands. In another example, the documentation extraction program 101 may communicate with a software product located on a UNIX or Linux desktop computer, by execution of one or more shell script commands in the command line interface. The user device 201 is a device, such as a desktop computer or mobile device, which may have access to the online documentation 102. A user 200, through his user device 201, may access the online documentation 102 over a network 202, such as the Internet or locally.

The database 103 may also store documentation including computer program code from at least one version of the software program. It should be appreciated that the documentation extraction program 101 may be executed in one or more devices, such as the user device 201, network 202 or operational environment 104.

Figure 3:
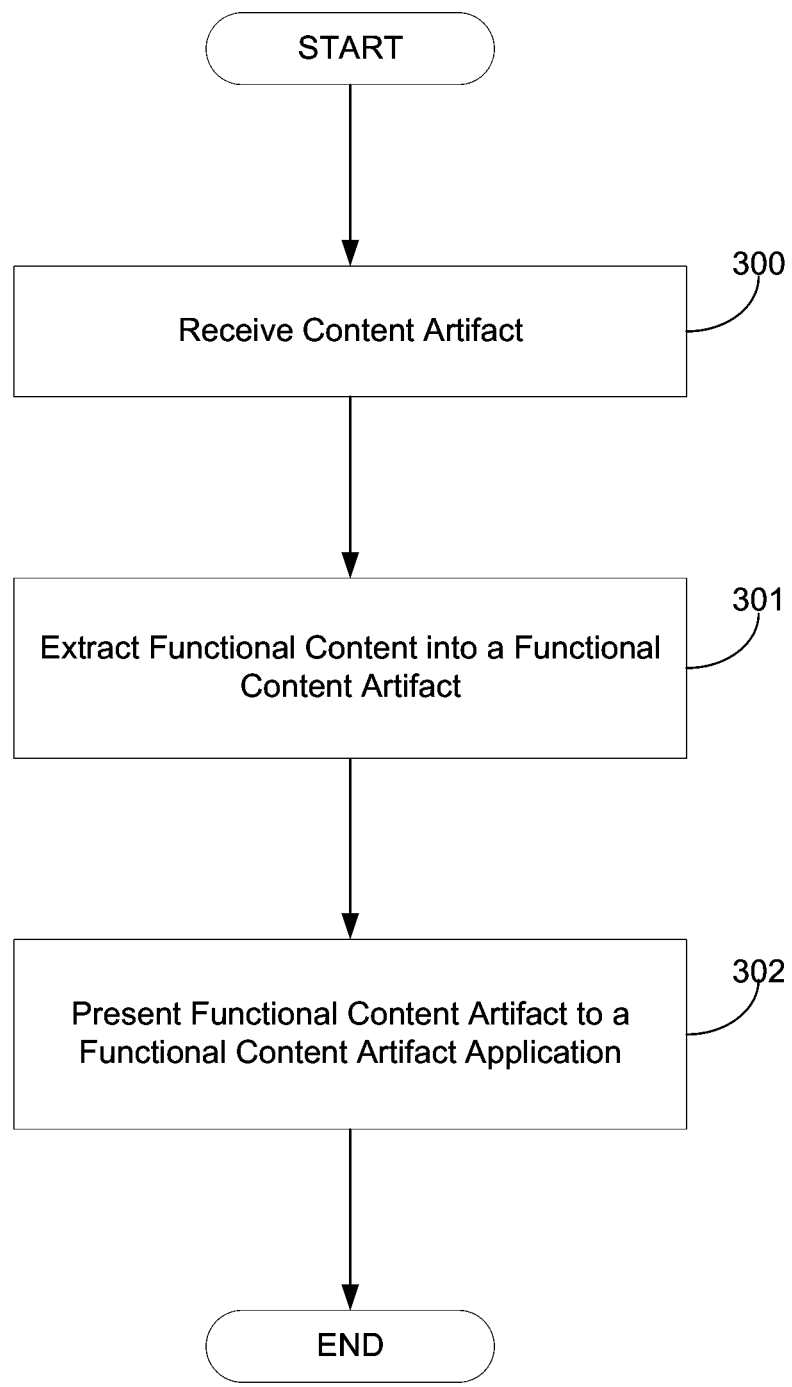
FIG. 3 is a flow chart diagram depicting the documentation extraction program in accordance with at least one embodiment of the invention.

Referring now to the flow chart diagram of FIG. 3, FIG. 3 depicts at least one embodiment of the documentation extraction program 101. According to the depicted embodiment, at step 300, the documentation extraction program 101 may receive a content artifact from the online documentation 102. The content artifact may include HTML code from the online documentation 102, functional content 105, as well as information content 106. The online documentation 102 may be accessible via a number of services, including a network 202, such as the Internet, locally stored data on a user device 201, such as a desktop computer or mobile device, or together with the software product in an operational environment 104, such as a server on which the software product is installed.

The content artifact may include all parts of the HTML code, including functional text informational text, and markup. At step 301, the documentation extraction program 101 may create a functional content artifact 107 by copying only the functional text from the content artifact into a text file. The functional content artifact 107 may include only functional text, specifically computer program code.

The documentation extraction program 101 may extract functional content 105, according to one or more decision criteria 108. In general, the decision criteria 108 provide one or more heuristics by which the documentation extraction program 101 distinguishes between what is informational text or markup and what is functional text. Here, the documentation extraction program 101 distinguishes what part of the code is executable within an operational environment 104.

With regards to new documentation prepared for compatibility with the documentation extraction program 101 in mind, the functional content 105 may be specifically called out programmatically using an HTML class or XML tag. Alternatively, with historical documentation or documentation created by a third party, the functional content 105 may be distinguished by using a cascading style sheet ("CSS"). For example, the functional content 105 may be given a gray background. In another example, documentation extraction program 101 may detect that the functional content 105 within the online documentation 102 may be italicized, underlined or bolded. In yet another example, the documentation extraction program 101 may detect that the functional content 105 within the online documentation 102 may be highlighted or enclosed within a box. Generally, the documentation extraction program 101 may extract the functional content 105 as plain text from the online documentation 102 based on the decision criteria 108.

At step 302, the documentation extraction program 101 may present the functional content artifact 107 to a functional content artifact application.

A functional content artifact application may receive and use the functional content artifact 107. An example of a functional content artifact application is a program that displays the functional content 105, as isolated in the functional contact artifact 107, to the user 200. For example, the documentation extraction program 101 may display the functional content artifact 107 on a network 202, such as the Internet, by means of identifying and highlighting the functional content artifact 107 in the online documentation 102. In another example, the documentation extraction program 101 may display the functional content artifact 107 as text on an interface 204 located between the documentation extraction program 101 and an operational environment 104 where the software product is installed. In yet another example, the documentation extraction program 101 may display the functional content artifact 107 as a text file, which may further be stored in a database 103.

Figure 4:
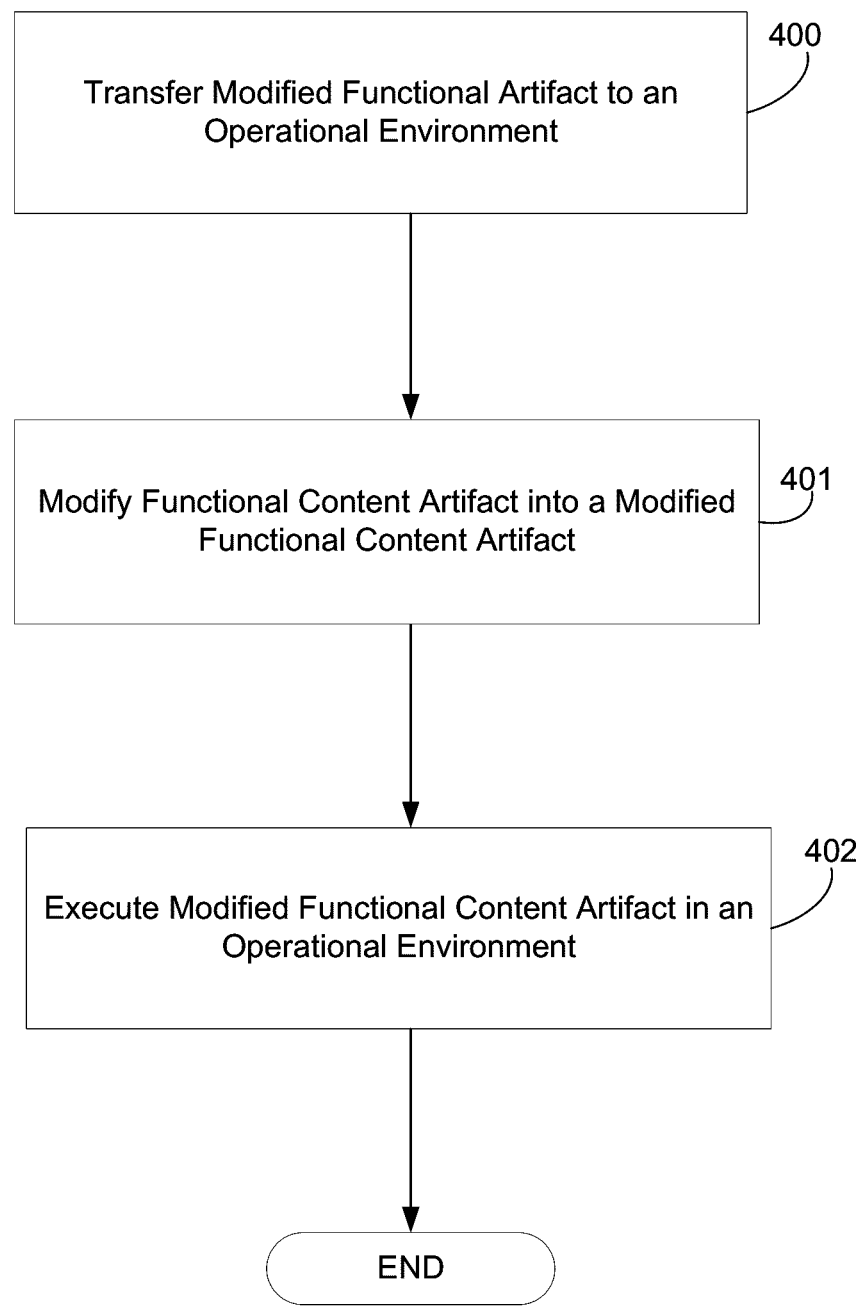
FIG. 4 is a flow chart diagram depicting additional steps for the documentation extraction program in accordance with at least one embodiment of the invention.

Referring now to the flow chart diagram of FIG. 4, FIG. 4 depicts steps for presenting the functional content artifact 107 to the functional content artifact application of step 302 of FIG. 3. According to step 400, the functional content artifact 107 may be transferred to an operational environment 104. For example, the functional content artifact 107 may be transferred via secure copy ("SCP"). Here, the documentation extraction program 101 may prompt the user 200 on his user device 201 to enter his credentials, such as username and password.

In general, embodiments of the invention may transfer the functional content artifact 107 to one or more environments, including a user device 201, such as a desktop computer or mobile device, a network 202, such as the Internet, or an operational environment 104, such as a server. For example, the documentation extraction program 101 may transfer and store the functional content artifact 107 in a database 103. In another example, the documentation extraction program 101 may transfer the functional content artifact 107 as text to a user device 201 or on a network 202. In yet another example, the documentation extraction program 101 may transfer the functional content artifact 107, via an interface 204, to an operational environment 104 where the software product is installed, such as a server.

According to step 401, the documentation extraction program 101 may modify the functional content artifact 107 into a modified functional content artifact 109. Here, the modified functional content artifact 109 may be configured for execution in an operational environment 104 based on one or more environment characteristics of the operational environment 104. The documentation extraction program 101 may access the operational environment 104 where the software product is installed, such as a physical server or a virtual server in the cloud.

The documentation extraction program 101 may then perform a series of queries through an interface 204 to determine the specific environment characteristics of the operational environment 104, including installation paths, environment variables, optional modules installed on the software, server hostname, IP address or software product version. Here, the documentation extraction program 101 may modify the functional content artifact 107, which includes functional content 105 from the online documentation 102, into a modified functional content artifact 109. The modified functional content artifact 109 may be tailored to the specific environment characteristics of the operational environment 104.

At step 402, the modified functional content artifact 109 may be made available to the user 200 in the operational environment 104 where the software product is installed. For example, a user 200 via a user device 201, such as a desktop computer, may execute one or more shell script commands on a Linux or UNIX server, via a remote terminal program such as Secure SHell ("SSH"). In another example, a user 200 via a mobile device, such as a mobile phone, may execute one or more shell script commands on a Linux server, via a remote terminal program such as Mosh. In yet a further example, a user 200 via a user device 201, such as a desktop computer, may execute one or more shell script commands via a command line interface.

In general, embodiments of the invention depicted in FIGS. 3 and 4 may be performed by the documentation extraction program 101 through a push button application.

Referring now to the embodiment depicted in FIG. 3, the software documentation provider may include one or more push button applications within the online documentation 102. For example, the online documentation 102 may include a push button application within each section or subject area of the online documentation 102. Here, a user 200, such as a system administrator, through his user device 201, may in a single step, press the PUSH button and thereby cause the documentation extraction program 101 to execute steps 300, 301 and 302. For example, the push button application may be implemented by a JavaScript program, which is executed within the web browser. Alternatively, the push button application may be implemented as a server-side script application, for example using PHP, Perl, or other common server-side scripting languages. In another example, the push button application may be implemented by a browser extension to a browser such as Google Chrome or Mozilla Firefox, wherein a user-installed JavaScript application modifies the received content to include the push button and its functionality. In yet another example, the push button application may be implemented within a mobile app configured for viewing the online documentation 102.

In general, the embodiments of the invention may be implemented within one or more of the following applications:
 a. as a training aid to allow a user to observe the execution of the online documentation 102 on their actual system
 b. as a means of transferring data between systems, where the data is configured for operation in a specific system
 c. as a means for a customer to modify or update the software product installed on a remote system via a mobile device.

Figure 5:
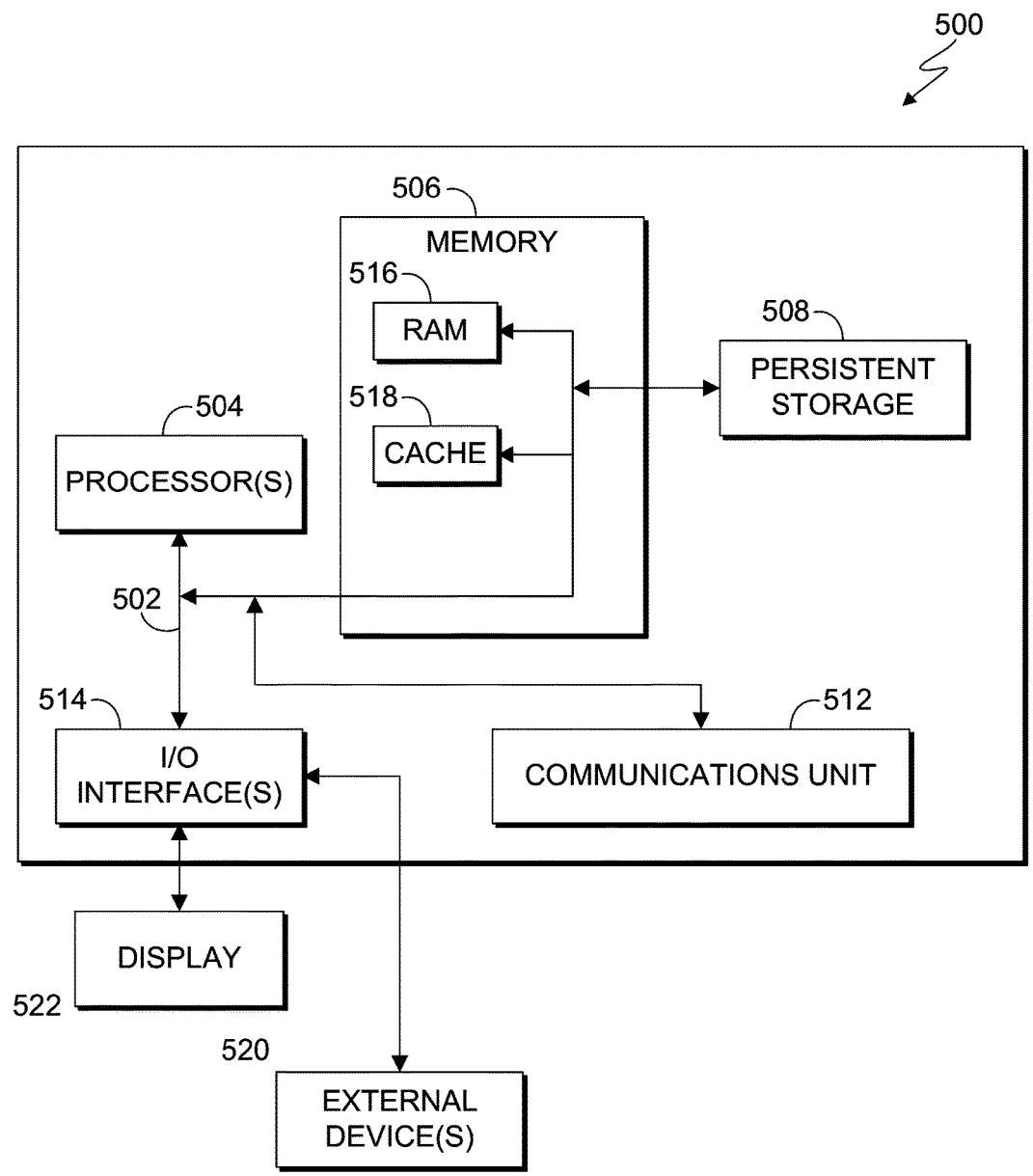
FIG. 5 is a block diagram of a computing apparatus 500 suitable for executing the documentation extraction program in accordance with at least one embodiment of the invention.

FIG. 5 is a block diagram depicting components of a computer 500 suitable for executing the documentation extraction program 101. FIG. 5 displays the computer 500, the one or more processor(s) 504 (including one or more computer processors), the communications fabric 502, the memory 506, the RAM 516, the cache 518, the persistent storage 508, the communications unit 512, the I/O interfaces 514, the display 522, and the external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the computer processor(s) 504, memory 506, persistent storage 508, communications unit 512, and input/output (I/O) interface(s) 514. The communications fabric 502 may be implemented with any architecture suitable for passing data or control information between the processors 504 (e.g. microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a random access memory (RAM) 516 and a cache 518. In general, the memory 506 may comprise any suitable volatile or non-volatile one or more computer readable storage media.

Program instructions for the documentation extraction program 101 may be stored in the persistent storage 508, or more generally, any computer readable storage media, for execution by one or more of the respective computer processors 504 via one or more memories of the memory 506. The persistent storage 508 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 may comprise one or more network interface cards. The communications unit 512 may provide communications through the use of either or both physical and wireless communications links. In the context of some embodiments of the present invention, the source of the software product information database 103 may be physically remote to the computer 500 and accessed via the communications unit 512.

The I/O interface(s) 514 allow for input and output of data with other devices that may operate in conjunction with the computer 500. For example, the I/O interface 514 may provide a connection to the external devices 520, which may be as a keyboard, keypad, a touch screen, or other suitable input devices. External devices 520 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 514. The I/O interface(s) 514 may similarly connect to a display 522. The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a content artifact from online documentation, said content artifact comprising hypertext markup language, said hypertext markup language comprising markup, information content, and functional content;
    extracting said functional content into a functional content artifact based on one or more decision criteria, wherein said one or more decision criteria is used to distinguish said functional content from both said markup and said information content by copying only plain text from said functional content of said online documentation to form said functional content artifact, wherein said functional content artifact is logically distinct from said markup and said information content; and
    presenting said functional content artifact to a functional content artifact application by:
        transferring said functional content artifact as plain text via secure copy, including prompting a user to enter one or more credentials, to an operational environment of a software product, said operational environment being logically distinct from an operational environment of said online documentation, and said operational environment being a command shell of a remote server and where said software product is installed;

modifying said functional content artifact into a modified functional content artifact, said modified functional content artifact being configured for operation in said operational environment based on one or more environmental characteristics of said operational environment, wherein said modified functional content artifact is tailored to one or more specific environment characteristics of the operational environment, and wherein said one or more specific environment characteristics of the operational environment includes at least one characteristic selected from the group consisting of: installation paths, environment variables, optional modules installed on the software, server hostname, internet protocol address, and software product version; and making available said functional content artifact in said operational environment by executing one or more shell script commands via secure shell.

2. A computer system, the computer system comprising:
one or more computer processors;
one or more computer readable storage media;
computer program instructions;
said computer program instructions being stored on said one or more computer readable storage media for execution by said one or more computer processors; and
said computer program instructions comprising instructions to:
  receive a content artifact from online documentation, said content artifact comprising hypertext markup language, said hypertext markup language comprising markup, information content, and functional content;
  extract said functional content into a functional content artifact based on one or more decision criteria, wherein said one or more decision criteria is used to distinguish said functional content from both said markup and said information content by copying only plain text from said functional content of said online documentation to form said functional content artifact, wherein said functional content artifact is logically distinct from said markup and said information content; and
  present said functional content artifact to a functional content artifact application by:
    transferring said functional content artifact as plain text via secure copy, including prompting a user to enter one or more credentials, to an operational environment of a software product, said operational environment being logically distinct from an operational environment of said online documentation, and said operational environment being a command shell of a remote server and where said software product is installed;
    modifying said functional content artifact into a modified functional content artifact, said modified functional content artifact being configured for operation in said operational environment based on one or more environmental characteristics of said operational environment, wherein said modified functional content artifact is tailored to one or more specific environment characteristics of the operational environment, and wherein said one or more specific environment characteristics of the operational environment includes at least one characteristic selected from the group consisting of: installation paths, environment variables, optional modules installed on the software, server hostname, internet protocol address, and software product version; and
    making available said functional content artifact in said operational environment by executing one or more shell script commands via secure shell.

3. A computer program product, the computer program product comprising one or more computer readable storage media and program instructions stored on said one or more computer readable storage media, said program instructions comprising instructions to:
  receive a content artifact from online documentation, said content artifact comprising hypertext markup language, said hypertext markup language comprising markup, information content, and functional content;
  extract said functional content into a functional content artifact based on one or more decision criteria, wherein said one or more decision criteria is used to distinguish said functional content from both said markup and said information content by copying only plain text from said functional content of said online documentation to form said functional content artifact, wherein said functional content artifact is logically distinct from said markup and said information content; and
  present said functional content artifact to a functional content artifact application by:
    transferring said functional content artifact as plain text via secure copy, including prompting a user to enter one or more credentials, to an operational environment of a software product, said operational environment being logically distinct from an operational environment of said online documentation, and said operational environment being a command shell of a remote server and where said software product is installed;
    modifying said functional content artifact into a modified functional content artifact, said modified functional content artifact being configured for operation in said operational environment based on one or more environmental characteristics of said operational environment, wherein said modified functional content artifact is tailored to one or more specific environment characteristics of the operational environment, and wherein said one or more specific environment characteristics of the operational environment includes at least one characteristic selected from the group consisting of: installation paths, environment variables, optional modules installed on the software, server hostname, internet protocol address, and software product version; and
    making available said functional content artifact in said operational environment by executing one or more shell script commands via secure shell.

* * * * *